(No Model.) 7 Sheets—Sheet 1.

W. H. AVIS.
CORDAGE MACHINE.

No. 545,033. Patented Aug. 20, 1895.

Witnesses
Albert B. Blackwood
Jos H. Blackwood

Inventor
Walter H. Avis
by Wm H. Doolittle
Attorney (No Model.)

W. H. AVIS.
CORDAGE MACHINE.

No. 545,033.  Patented Aug. 20, 1895.

7 Sheets—Sheet 3.

Witnesses
Albert B. Blackwood
Jos H. Blackwood

Inventor
Walter H. Avis
by Wm H. Doolittle
Attorney (No Model.) 7 Sheets—Sheet 4.
W. H. AVIS.
CORDAGE MACHINE.
No. 545,033. Patented Aug. 20, 1895.
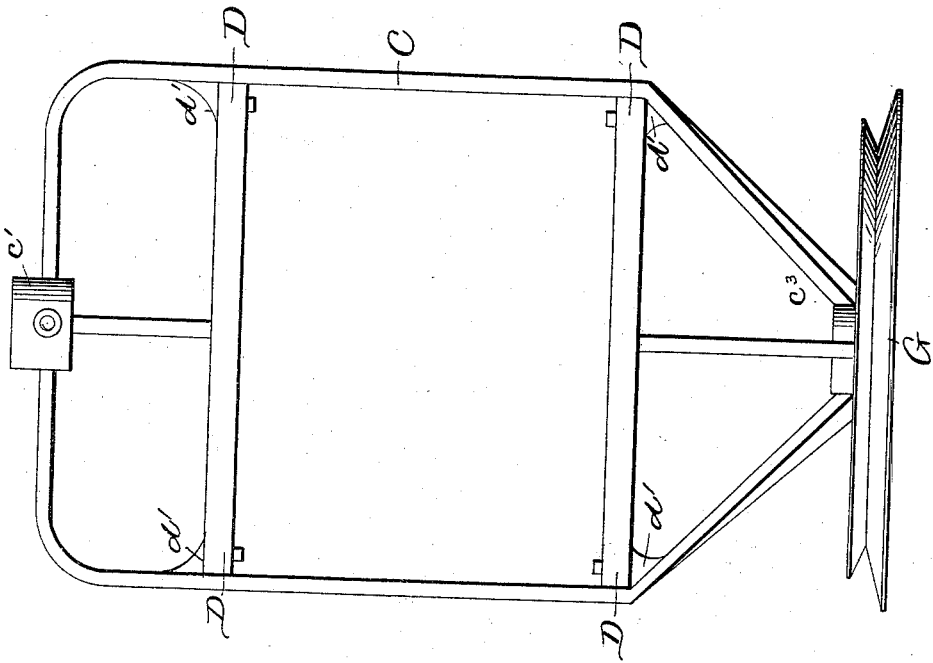
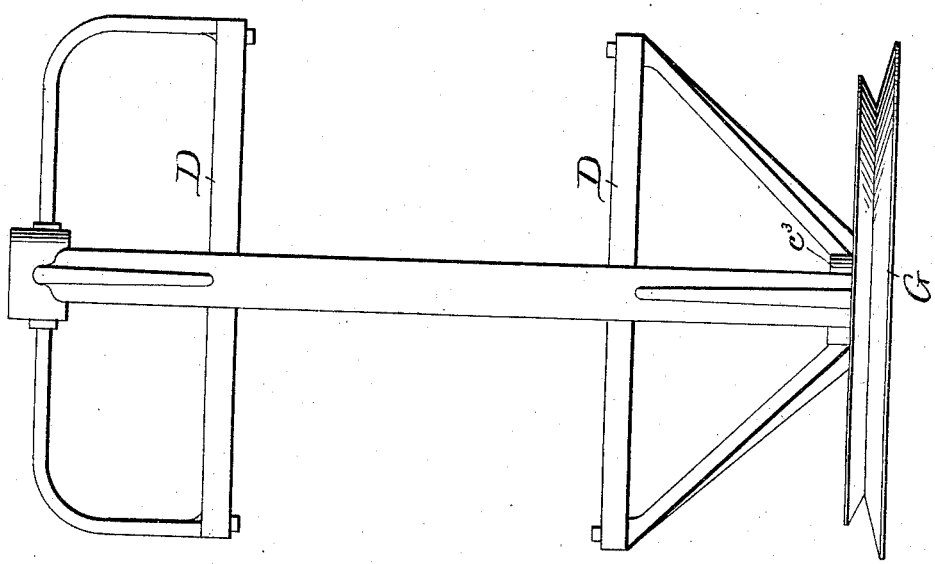
Witnesses
Albert B. Blackwood
Jos H Blackwood
Inventor
Walter H. Avis
by Wm H Doolittle
Attorney (No Model.) 7 Sheets—Sheet 5.
W. H. AVIS.
CORDAGE MACHINE.
No. 545,033. Patented Aug. 20, 1895.
Fig. 6.
Fig. 8.
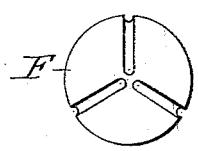
Fig. 7.
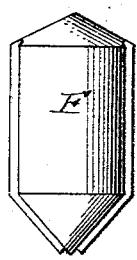
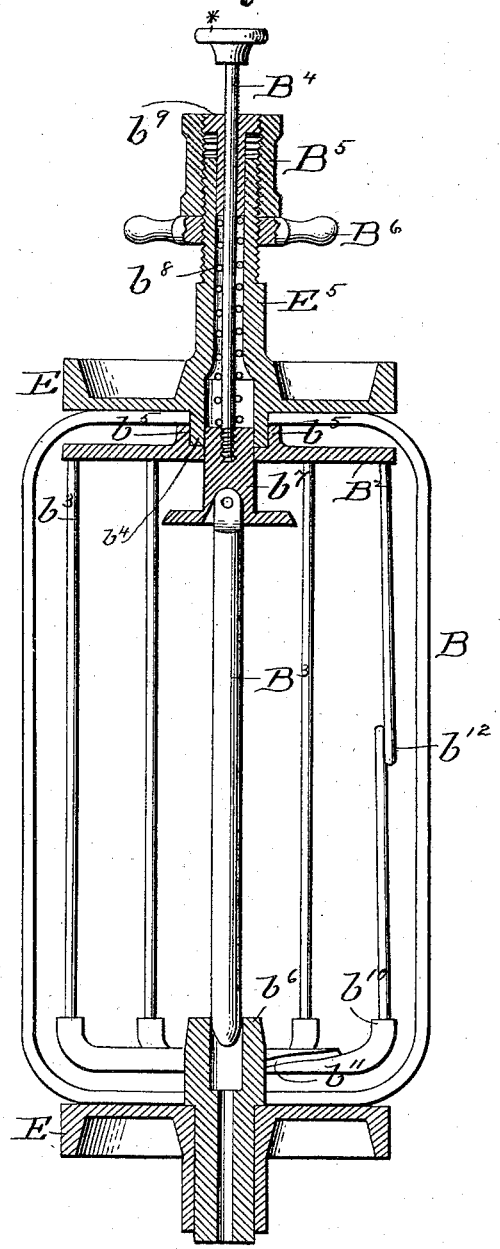
Witnesses
Albert B. Blackwood
Jos. H. Blackwood
Inventor
Walter H. Avis
by Wm H. Doolittle
Attorney (No Model.)

7 Sheets—Sheet 6.

W. H. AVIS.
CORDAGE MACHINE.

No. 545,033.

Patented Aug. 20, 1895.

Witnesses
Robert B. Blackwood
Josh Blackwood

Inventor
Walter H. Avis
by Wm. H. Doolittle
Attorney (No Model.)

W. H. AVIS.
CORDAGE MACHINE.

No. 545,033.

7 Sheets—Sheet 7.

Patented Aug. 20, 1895.

Witnesses
Albert B. Blackwood
W. G. Doolittle

Inventor
Walter H. Avis
by M. H. Doolittle
Attorney

UNITED STATES PATENT OFFICE.

WALTER H. AVIS, OF TORONTO, CANADA, ASSIGNOR TO ROBERT C. FISHER, OF SAME PLACE.

CORDAGE-MACHINE.

SPECIFICATION forming part of Letters Patent No. 545,033, dated August 20, 1895.

Application filed December 2, 1893. Serial No. 492,616. (No model.)

*To all whom it may concern:*

Be it known that I, WALTER H. AVIS, a citizen of Great Britain, residing at Toronto, in the county of York, Ontario, Dominion of Canada, have invented certain new and useful Improvements in Cordage-Machines; and I do hereby declare the following to be a full, clear, and exact description of the invention, such as will enable others skilled in the art to which it appertains to make and use the same.

The principal object of my present invention is to improve the general construction of that form of cordage-machines in which driving and driven rings are employed to actuate the flier-frame, bobbins, stretching and reeling frames.

The invention consists of the various parts and combinations of parts, as set forth in the following specification and as particularly claimed.

My invention is illustrated in the accompanying drawings, in which—

Figure 1:
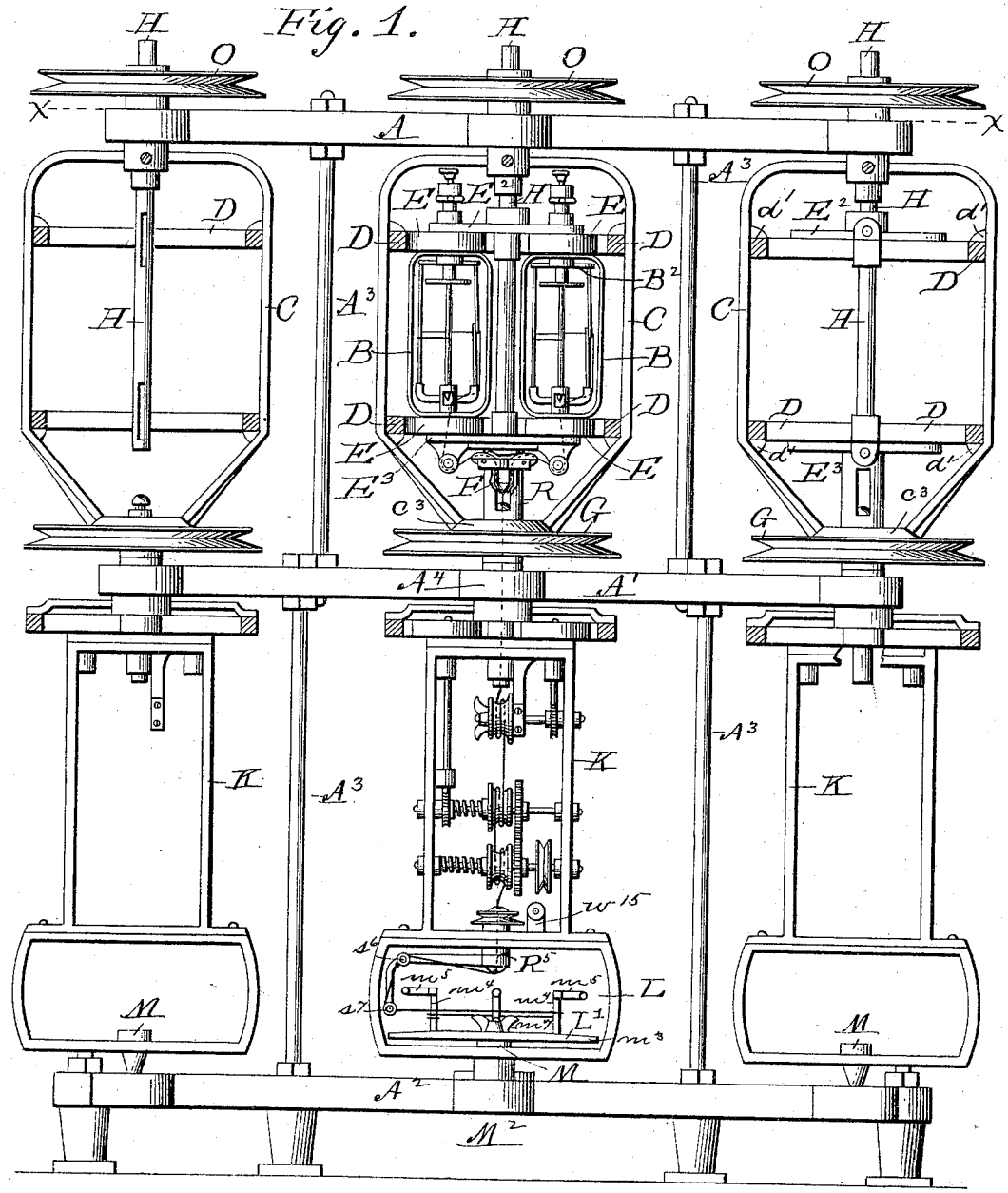
Figure 2:
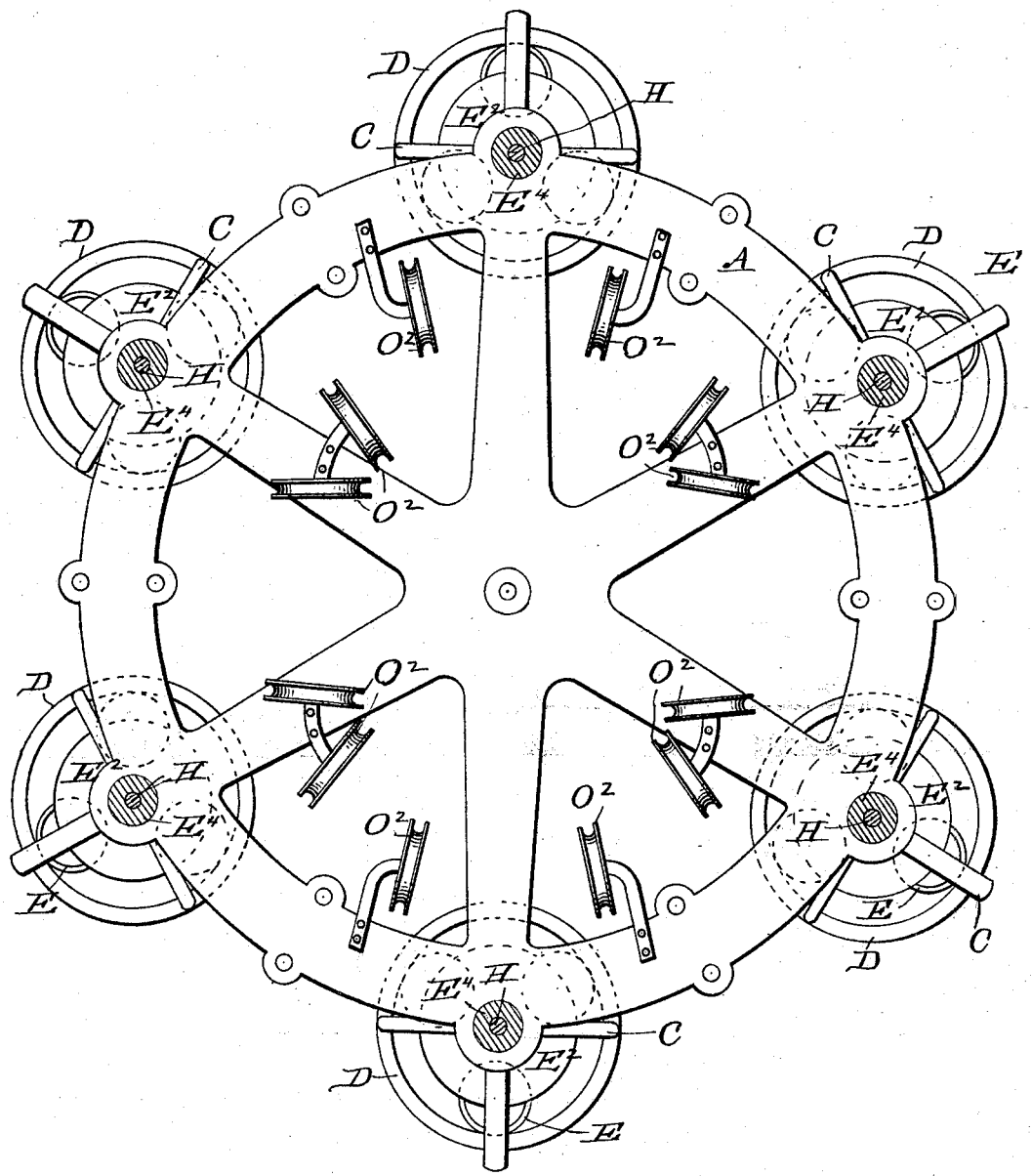
Figure 3:
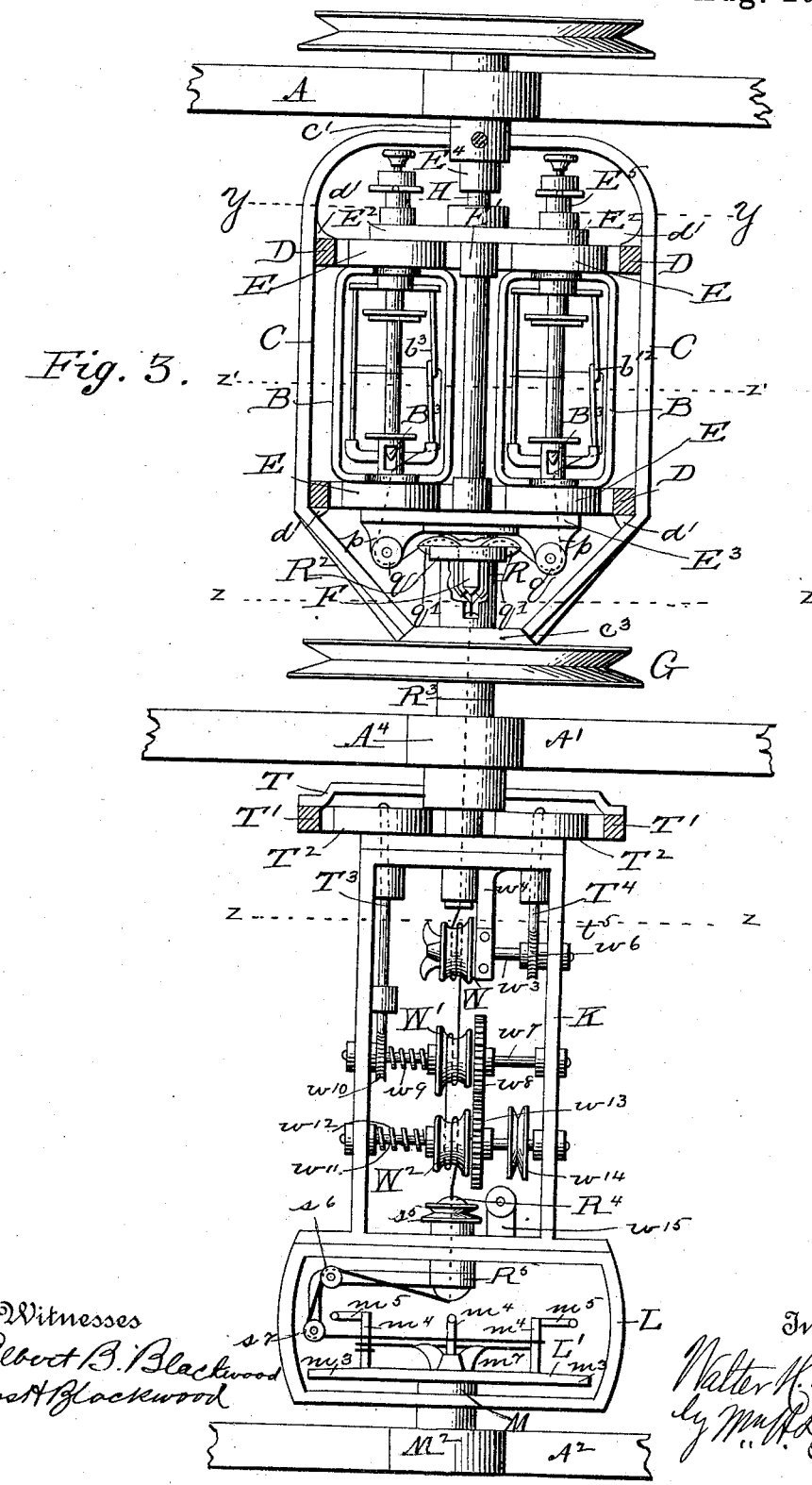
Figure 9:
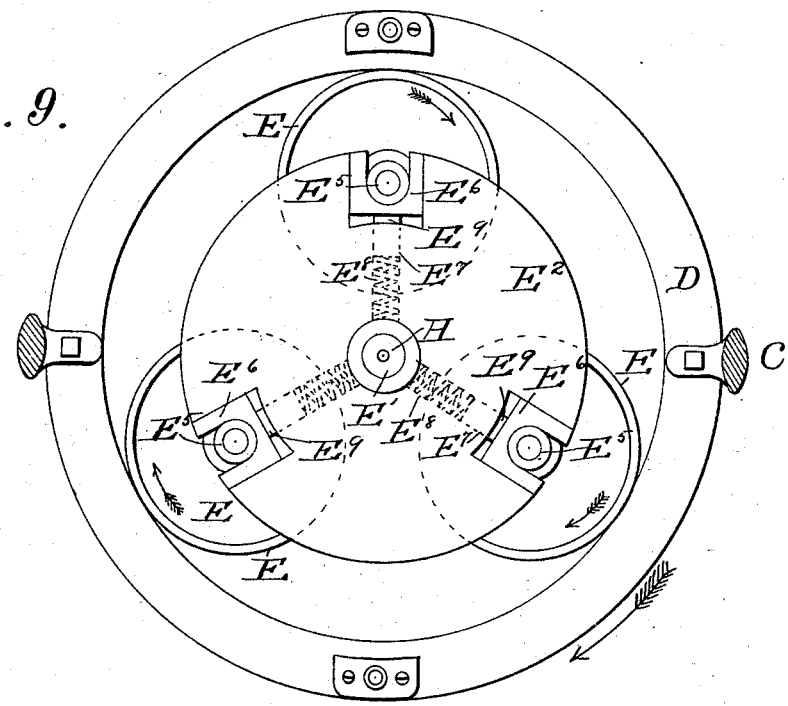
Figure 10:
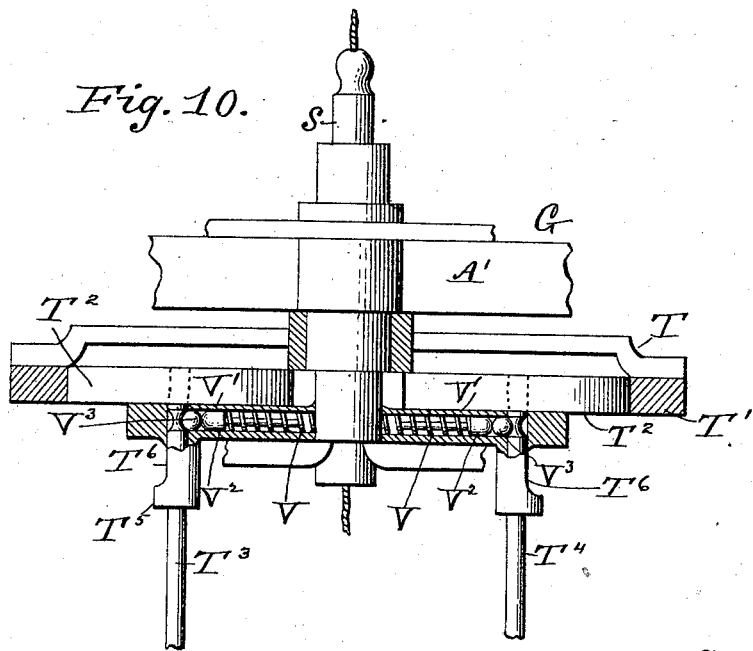

Figure 1 is a side view in elevation, partly in section; Fig. 2, a sectional plan on line $x\ x$ of Fig. 1; Fig. 3, an enlarged side view in elevation, partly in section, of one set of mechanisms forming a single machine. Figs. 4 and 5, respectively, are different skeleton views in elevation of the ring-frame; Fig. 6, a view in elevation, partly in section, of a flier and its shaft, the inclosed bobbin-frame, and mechanism for adjusting and removing the flier and bobbin frames; Figs. 7 and 8, details of a top, and are, respectively, a side view in elevation and bottom plan of the same; Fig. 9, a sectional plan on line $y\ y$ of Fig. 3; Fig. 10, a detail in elevation, partly in section, between dotted lines $z\ z\ z\ z$ of Fig. 3; and Fig. 11 a sectional detail between $z\ z$ and $z'\ z'$ of Fig. 3.

Referring to the drawings, it will be seen that the framework of the machine consists of three separate decks or platforms A A' A², connected by heavy vertical rods A³, which are shouldered at their opposite ends, there screw-threaded and nuts applied, by which construction the frame can be easily taken apart for packing and shipment and easily and quickly put up. Between these standards are mounted separate independent sets of fliers and stretching and reeling mechanisms, each set driven by its own pulley, so that the machine may be regarded as composed of a series of independent machines, each separately seated in the frame, each capable of being worked alone or two or more together, and with the frame thus constructed the number of sections, and consequently the number of machines, can be increased or diminished, and also by this construction of an open framework easy access to all the parts of the machine may be had.

Between the upper deck A and the middle deck A' are placed the fliers B, bobbin-frames B², and bobbin-spindles B³; the outside ring-frame C, within which the fliers revolve; the rings D, carried by said ring-frame; the rollers E, engaging with the rings; the top and twisting mechanism; the pulley G, for rotating the ring-frame, and other minor parts.

Between the middle deck A' and the lower deck A², and on a direct vertical line with the ring-frame shaft H, are the stretching and reeling mechanisms, comprising the drawing-frame K, stretching-capstans, the trailer-frame L, and reel L', the latter attached to a pivot M, which is stepped in a socket-piece M², fixed in the lower deck. The particulars of the main parts thus referred to are hereinafter described.

By referring to the plan view, Fig. 2, it will be seen how each machine is arranged in connection with the upper supporting-deck. That view is taken at the top of the deck A and just below the driving-pulley O. In this arrangement the deck A, like the others, is a circular one, and there are six sets of machines indicated. Each set has a ring-frame and ring, three rollers, a flier, and a bobbin-frame for each roller, a driving-pulley for the flier and one for the ring, a top, and a drawing-frame and reel. Power is taken from pulleys on an overhead main shaft, not shown, which shaft extends over and across the center of the deck A. From said shaft-pulleys belts are conducted over idle-pulleys O², secured to the top of the deck A, and from thence to the pulleys O, each of which is secured to a separate main spindle H for rotating the flier-frames.

The fliers B carry at top and bottom rollers E, which rollers are connected to top and bottom plates E² E³, which are secured to a sleeve on the shaft H. The fliers are inclosed by and revolved within the ring-frame C. (Shown in detail in Figs. 4 and 5.) The frame C is an open circular work composed of vertical rods, which at the top are bent at right angles and are passed into a hub $c'$, which is secured to a sleeve $E^4$, placed on shaft H. At their lower ends the rods are inclined inward and secured to a hub $c^3$ on top of the ring-driving pulley G. The pulley G is hung on a hollow shaft R, journaled in box $A^4$, set in deck $A'$, and is driven by a belt from the overhead shaft above mentioned or from any other suitable source. The rings D are secured to the ring-frame by being bolted to lugs $d'$, extending from the inner sides of the rods of which the frame is composed. These rings are in contact with the rollers E, carrying the flier-frames, and are rotated in the opposite direction from the flier-frames. They perform the functions of driving said rollers, guiding them, and maintaining the fliers and bobbins in proper position for doing the work of twisting. The connection of the rollers with the rings, the roller-carriers with their plates, and the means of maintaining the pressure-contact of rollers and rings are shown in top view in Fig. 9. The top plate $E^2$ has on its upper surface at the center a sleeve $E'$, which is secured to the center shaft H.

Figure 11:
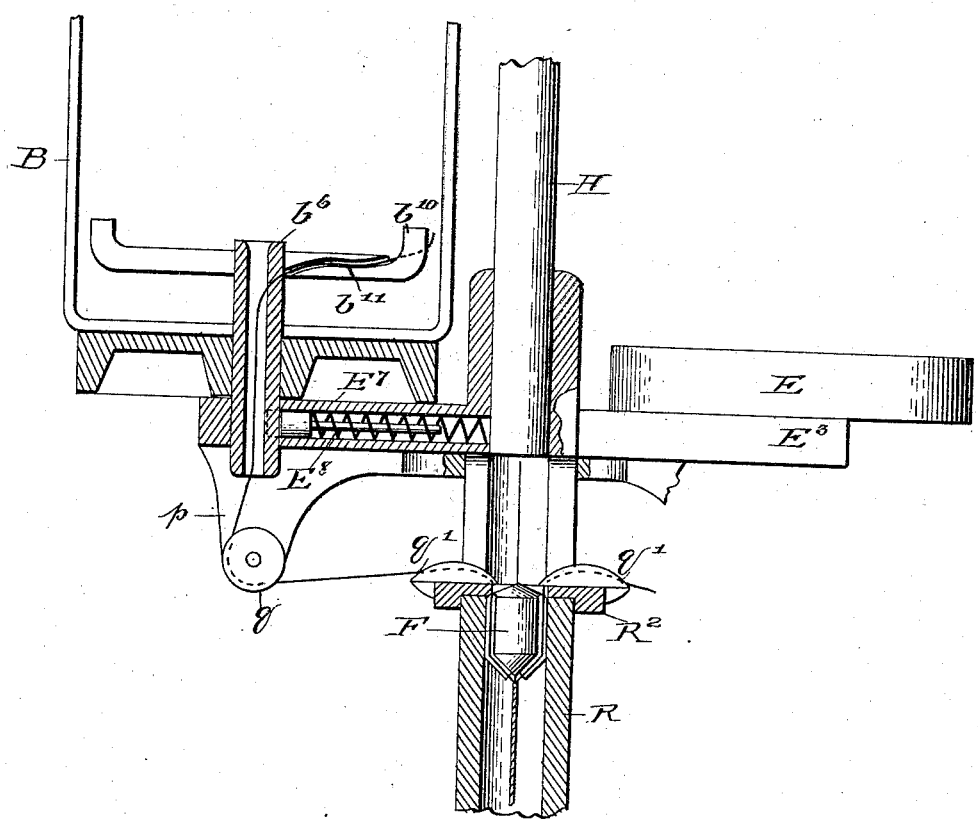

$E^5$ are short hollow shafts, each extending through plate $E^2$ near its periphery and constituting extensions of the hubs of rollers E. Each of these shafts $E^5$ has a bearing in an open slotted journaled box $E^6$, placed in plate $E^2$. Radiating from the center shaft H, and entering the journal-boxes, are tubes $E^7$, each of which contains a spiral spring $E^8$. This spring is in axial alignment with a rod $E^9$, which abuts against the hollow shaft $E^5$, and at the other end the spring abuts against the sleeve $E'$, carried by shaft H. These parts constituting the tension-pressure connection of rollers and rings are duplicated in connection with the bottom plate $E^3$, as shown in Fig. 11. The flier-frame or bobbin-carrier B, the bobbin-frame $B^2$, and their connections with an upper and lower roller, are illustrated in detail in Fig. 6.

The rods composing the flier-frame are cast or otherwise connected at their upper ends to hub $b^4$ of one of the rollers E, which extends down and is inclosed by hub $b^5$ of bobbin-frame $B^2$. The lower ends of the flier-frame are connected to a socket-piece $b^6$, in which the lower end of the bobbin-spindle $B^3$ is placed, and which socket slides in and carries the hub of a bobbin-roller E. The lower end of the bobbin-frame is also connected to the socket-piece $b^6$. The upper end of bobbin-spindle $B^3$ is pivoted to a pressure-block $b^7$, adapted to slide in the hub $b^4$ of a roller E. To the block $b^7$ is secured a rod $B^4$, provided at its top with a knob *, which rod passes down through the hollow hub $b$ of the roller E. This hub extends some distance above the said roller, constituting the hollow shaft $E^5$ before mentioned, and the spiral spring $b^8$ is placed within it and around the rod $B^4$. The spring presses at its lower end on block $b^7$ and at its upper end against a bushing $b^9$ in shaft $E^5$, and through which plug the rod $B^4$ also passes. The bushing $b^9$ has a head which is screw-threaded to engage with an internally-screw-threaded cap $B^5$, and which cap also engages with an external screw-thread on roller-shaft $E^5$.

$B^6$ is a finger-hold screwed onto the shaft $E^5$ beneath the cap $B^5$.

The lower end of bobbin-spindle $B^3$ is placed in the socket $b^6$ and held there by the downward pressure of the spring $b^8$ on the block $b^7$, to which the spindle is secured. A spool is placed on the bobbin-spindle and rotates thereon. The tension of the spring $b^8$ is regulated by a screw-cap $B^5$ and plug $b^9$. The bobbin-spindle is released so that the spool may be unshipped by pressing it upward or by raising the pressure-block $b^7$ by the knob * at the top of rod $B^4$ until the spindle $B^3$ is raised from the socket $b^6$. The bobbin-frame itself may be unshipped by unscrewing the rod $B^4$ from the block $b^7$, removing the socket-piece $b^6$ from its seat in the hub of the lower roller, and then slipping the upper hub $b^5$ of the bobbin-frame off of the hub $b^4$ of roller E. It will be noticed that a flier-frame is thus composed of two rollers E united by steel rods, which rods are sufficiently apart to permit access to and insertion and removal of the bobbin, bobbin-frame, and spindle.

The bobbin-frames $B^2$ are composed of vertical steel guide-rods $b^3$, connected at their upper ends to a top plate of the bobbin-frame $B^2$, having the hub $b^5$, previously described, and at their lower ends to what is known as an "unreeling-frame," composed of hollow rods $b^{10}$, connected to the hollow and tubular socket $b^6$, and one of which rods has a spiral groove $b^{11}$ to receive and guide the strand as it comes from a spool on the bobbin-spindle and through an eye $b^{12}$ on the bobbin-frame $B^2$ into the hollow socket $b^6$ on its way to the twister, around pulleys $q$, over guides $q'$, thence through perforations in plate $R^2$, and on to the top.

The rings D are retainers to the carriers, and they perform the triple function of keeping the carriers from leaving their guides, rotating the rollers carrying the fliers, and increasing the speed of the rollers, to which they move in a reverse direction.

Beneath the flier and bobbin frames and rollers E is the bottom plate $E^3$, provided with brackets $p$, on which are carried pulleys $q$, over which the strands are carried to the top F. The top F (shown in detail in Figs. 7, 8, and 11) is cone-shaped at its opposite ends and grooved to receive the strands. It is hung within the hollow shaft R, its upper end socketed in plate $R^2$, which is perforated to receive the strands from the pulleys $q$, and which perforations agree with the number of grooves in the top. Of course the number of these perforations and grooves may be varied according to the number of strands to be twisted. The strands are twisted into a cord below the lower end of the top and the cord there formed is then conducted, as shown in Fig. 10, through a hollow spindle S to the stretching and reeling mechanism. The spindle extends down through a hub $c^3$ on pulley G, through sleeve $R^3$, carrying that pulley and journaled in box $A^4$ in middle deck $A'$, and through a sleeve below said box to which a lower ring-frame T is secured. $T^2$ are rollers which are secured to frame K and rotated thereby from power given to ring-frame pulley G.

$T'$ is the ring which actuates and guides the rollers in this arrangement.

$T^3 T^4$ are pendent rods which, secured to the rollers $T^2$, extend through the top of the drawing-frame.

Pressure of the rollers $T^2$ against the ring $T'$ is maintained by means of spiral springs V, Fig. 10, within tubes $V'$ the springs being placed around headed pins $V^2$. The tubes $V'$ radiate from a sleeve on center spindle S and connect with the upper ends of roller-carrying rods $T^3 T^4$. Between the heads of the pins $V^2$ and the said rods are placed ball-bearings $V^3$. The rods $T^3 T^4$ pass at their upper ends through short hollow sleeves $T^5$, cast on tubes $V'$, and which have openings $T^6$ in their sides to permit access to bearings for oiling the same.

Within the drawing-frame K are hung a series of capstans W W′ W², one above the other. The upper capstan W is mounted on a shaft $w^3$, having its bearings at one end in a dependent bracket $w^4$ and its opposite end journaled in the frame K. The pendent rod $T^4$ on this side is provided at its lower end with a worm $t^5$, which engages with a worm-wheel $w^6$ on shaft $w^3$. The next lower capstan W′ is mounted on a shaft $w^7$, journaled in the frame K, which shaft is provided with a gear-wheel $w^8$. On one side of the capstan the shaft $w^7$ is provided with a spring $w^9$ and worm-wheel $w^{10}$. The worm-wheel $w^{10}$ engages with a worm in the lower end of the pendent roller-rod $T^3$. The lower capstan $W^2$ is mounted on shaft $w^{11}$, having its bearings in the opposite sides of the frame K, and which shaft also carries a spring $w^{12}$ and gear-wheel $w^{13}$, which wheel engages with gear $w^8$ of the shaft above. The springs $w^9$ and $w^{12}$ bear against the bearings of capstans W′ W² for the purpose of preventing any lateral movement of the capstans which may arise from wear of the parts, and to thus maintain the capstans in a true vertical line as respects the cord which is being wound thereon. It will be seen that the capstans are operated by rollers $T^2$ through rods $T^3 T^4$. Referring to Fig. 3 for the operation of these capstans, the first capstan-draw W receives its motion from the worm $t^5$, which engages with worm-wheel $w^6$ on the right hand and back side looking at the face of the figure. The cord is wound spirally several times around the capstan W, thence carried to the second capstan W′, which is also driven by a worm, as above described, this worm being on the face or left side of the frame and thus giving a reverse motion to capstan W′. A gear attached to the shaft of W′ engages with another gear upon the shaft which is a mandrel for capstan $W^2$. These lower capstans W′ and $W^2$ are driven by friction-disks upon their respective spindles and revolve reversely to each other, the lower one revolving the same way as W. The twine, as shown, is wound around the middle capstan W′, the reverse from W and $W^2$. From the lower capstan the cord passes through the hollow spindle, to which is secured a V-wheel on the top side and a trailer or winding arm upon the under side of its journal.

$R^4$ is a hollow spindle through which the cord is carried from the capstans to the trailer. It is at the bottom of the drawing-frame and extends within the trailer-frame L and is provided at its top with a pulley $s^5$.

$R^5$ is a trailer-arm keyed onto spindle $R^4$ and provided with pulleys $s^6 s^7$, over which the cord is carried to the reel L′. The reel L′ is composed of bottom plate $m^3$, and three upright arms $m^4$, having top horizontal arms $m^5$. It also has a thumb-nut $m^7$, securing the reel to pivot-post M, which sets in socket $M^2$ in the lower deck $A^2$. A pulley $w^{14}$ is mounted on shaft $w^{11}$ within the drawing-frame, and an idle-pulley $w^{15}$ on the bracket rising from the floor of said frame. A belt is placed over said pulleys and around pulley $s^5$ on spindle $R^4$, whereby rotary motion is imparted to the trailer and reel from the ring-pulley G through the intermediate rollers and drawing-frame.

In the construction of this system of machinery it will be noticed that it can be expanded from a single set of machines for twisting the strands and reeling the cords to as many as desired by increasing the number and size of the decks and providing the same with the requisite number of seats. Spindles are also dispensed with in rotating the drawing and reeling frames, the same being carried by the rollers which are actuated by power from the ring-frame.

Instead of operating each set of machines by the main driving-pulley O above the upper deck such pulleys might be located beneath the deck.

The operation of the machine may be summarized by stating that the strands are led, by the action of the drawing device, from the spools on the bobbin-frame around the guide-wires $b^3$, through the eye $b^{12}$, thence down through grooves $b^{11}$ of bottom rods $b^{10}$ of bobbin-frame into and through hollow socket $b^6$, on which the bobbin-frame is secured, thence to the top F, where the strands are laid and twisted, thence down through the tubular connection with frame K, over the stretching capstans, and then over the trailer and around the reel.

The manner of compounding the twist and of laying the cord has already been indicated and described.

Having thus described my invention, what I claim is—

1. The combination with a vertical separable frame work, of lower, central and upper circular decks mounted on said frame work, an upper machine for unreeling and twisting the cord mounted between the central and upper deck, a lower machine for drawing and reeling the cord mounted between the central and lower deck, a central spindle, S, connecting said upper and lower machines, a central pulley, G, on said spindle, said upper machine consisting of an outside ring frame, rings carried by said ring frame, a second central spindle, H, said ring frame connected to said spindle S and said pulley, rollers engaging with the rings, said rollers connected with and operated by said spindle, H, flier frames within said ring frame and carrying said rollers, bobbin frames and spindles for said bobbin frames within said flier frames, a pulley O on said spindle, H, for operating the same, and a top below said rollers, said lower machine composed of a ring frame secured to said spindle, S, a ring, and rollers within said ring, a drawing frame carrying said rollers, a series of horizontal capstans mounted within said frame, worm and gear mechanism connected with said rollers for operating said capstans, and a reeling mechanism secured below and to the frame of the said drawing mechanism, substantially as described.

2. The combination with an upper and lower supporting deck of an outside vertical ring frame, C, mounted between said decks, upper and lower rings secured to the inner walls of said ring frame, upper and lower rollers placed inside of and in contact with said rings, fliers carrying said upper and lower rollers, bobbins within said fliers, top and bottom plates to which said rollers are journaled, a central shaft provided with sleeves to which said plates are secured, the upper end of the ring frame secured to a loose sleeve on said shaft, said shaft provided at its upper end with a pulley by which said fliers, rollers and bobbins are rotated, and a lower pulley and shaft for rotating the ring frame in an opposite direction to the fliers, substantially as and for the purpose described.

3. The combination with a flier frame, and top and bottom rollers, of the bobbin frame and bobbin spindle, a socket piece to which the lower end of the flier frame is connected, and in which the lower end of the bobbin spindle rests, an adjustable tension and unshipping device for releasing the bobbin spindle and bobbin frame, consisting of a rod, a pressure block carrying the bobbin spindle and to which block said rod is secured, a spiral spring around said rod and bearing at one end against said block, said upper roller having an upwardly extending hollow hub forming a shaft, said rod extending through said shaft, a bushing within said shaft forming the upper bearing of said spring, a screw coupling on said shaft and connected to said bushing to regulate the tension of said spring, substantially as described.

4. In combination with outside ring frame C, and its driving pulley, the upper and lower rings D, the upper and lower rollers E, having vertical hollow hubs top and bottom plates $E^2$ $E^3$, to which said rollers are journaled, a central shaft H provided with sleeves to which said plates are secured said plates having hollow horizontal portions, each provided with a spring for pressing said rollers against said rings, fliers B revolving within said ring frame and carrying said rollers, bobbin frames and spindles within said fliers, brackets secured to said bottom plate $E^3$, pulleys on said brackets over which the cords are carried from the bobbin, a top below said pulleys, a hollow shaft R, in which said top is hung and a plate $R^2$, having perforations and guides for the cords, and to which said shaft is connected, substantially as and for the purpose described.

5. In combination with the top, of the hollow spindle, S, to receive the twisted cord from the top, a supporting deck in which said spindle is journaled and through which it extends, a sleeve on said spindle below said deck, the lower ring frame T secured to said sleeve, a ring T', the rollers $T^2$, a pulley G for actuating said spindle rollers, a spring tension device consisting of tubes V' radiating from said spindle and containing pins having springs thereon, and balls, $V^3$, pressing against said pins, the drawing frame, K, pendent rods, $T^3$, $T^4$, the upper ends of said rods extending into said tubes and bearing against said balls, substantially as described.

6. The drawing mechanism consisting of the combination with the drawing frame K of the ring frame and ring, the rollers carried by said drawing frame, pendent rods connecting said rollers and frame, said rods provided at their lower ends with worms, horizontal shaft, $w^3$, mounted in said frame and provided with a gear to engage with one of said worms and a capstan W, said capstan provided with a thumb nut to regulate the tension thereof, shaft $w^7$, and the capstan W', thereon, spring $w^9$, and gear $w^8$ thereon, and gear $w^{10}$, the latter gear engaging with the other of the said worms and lower shaft, $w^{11}$, capstan, $W^2$, drive pulley $w^{14}$, gear $w^{13}$, and spring $w^{12}$, on said shaft, hollow spindle $R^4$, and pulley $s^5$ thereon, and an intermediate pulley and belt connecting the pulley $w^{14}$ and the pulley $s^5$ substantially as described.

In testimony whereof I affix my signature in presence of two witnesses.

WALTER H. AVIS.

Witnesses:
HENRY J. FOWLER,
JOHN H. TENNANT.